United States Patent
Mukunan

(10) Patent No.: US 10,366,016 B2
(45) Date of Patent: Jul. 30, 2019

(54) ACCESS TO PERSISTENT MEMORY REGIONS OF COMPUTING DEVICES

(71) Applicant: HEWLETT-PACKARD DEVELOPMENT COMPANY, L.P., Houston, TX (US)

(72) Inventor: Sudish Mukunan, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/223,185

(22) Filed: Jul. 29, 2016

(65) Prior Publication Data
US 2018/0032449 A1 Feb. 1, 2018

(51) Int. Cl.
G06F 9/445 (2018.01)
G06F 12/14 (2006.01)
G06F 21/33 (2013.01)
G06F 21/62 (2013.01)

(52) U.S. Cl.
CPC .......... *G06F 12/1483* (2013.01); *G06F 21/33* (2013.01); *G06F 21/6281* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 7,921,287 B2 | 4/2011 | Sprigg et al. | |
| 8,275,672 B1* | 9/2012 | Nguyen | G06Q 30/0635 |
| | | | 705/26.1 |
| 9,893,885 B1* | 2/2018 | Miller | H04L 9/0891 |
| 2006/0036851 A1* | 2/2006 | DeTreville | G06F 9/4406 |
| | | | 713/159 |
| 2007/0079375 A1* | 4/2007 | Copley | G06F 21/566 |
| | | | 726/22 |
| 2008/0082828 A1* | 4/2008 | Jennings | G06F 21/72 |
| | | | 713/176 |
| 2010/0030990 A1* | 2/2010 | Asai | G06F 21/6209 |
| | | | 711/163 |
| 2013/0145455 A1 | 6/2013 | Vijayshankar et al. | |
| 2014/0068593 A1* | 3/2014 | McErlane | G06F 8/61 |
| | | | 717/171 |
| 2014/0372743 A1* | 12/2014 | Rogers | H04L 9/3234 |
| | | | 713/2 |

(Continued)

OTHER PUBLICATIONS

System Permissions, <https://developer.android.com/guide/topics/security/permissions.hmtl>.

*Primary Examiner* — Ryan Bertram
*Assistant Examiner* — Trang K Ta
(74) *Attorney, Agent, or Firm* — HPI Patent Department

(57) ABSTRACT

Examples disclosed herein provide the ability for a non-system application to gain controlled access to a persistent memory region of a computing device. In one example method, the computing device creates a group identifier that has permission only to a specific location under the persistent memory region. The computing device registers the non-system application to the group identifier, and adds a certificate associated with the non-system application to a mandatory access control (MAC) permission list. Upon adding the certificate to the MAC permission list, the computing device defines MAC permissions to the non-system application, with regards to accessing the specific location under the persistent memory region.

15 Claims, 3 Drawing Sheets

(56) References Cited

U.S. PATENT DOCUMENTS

| | | |
|---|---|---|
| 2015/0082458 A1 | 3/2015 | Cooper et al. |
| 2015/0089577 A1 | 3/2015 | Beckman et al. |
| 2016/0085981 A1 | 3/2016 | Bruwer et al. |
| 2017/0104585 A1* | 4/2017 | Cotta ................ G06F 21/00 |

* cited by examiner

ACCESS TO PERSISTENT MEMORY REGIONS OF COMPUTING DEVICES

BACKGROUND

Software applications, such as mobile application software (apps), are designed to run on computing devices, such as smartphones and tablet computers. Such devices may be sold with several apps bundled as pre-installed software, such as a web browser, email client, calendar, and mapping program. Apps that are not preinstalled are usually available through digital distribution platforms, also known as app stores. Usually, such apps are downloaded from the platform to a target device, such as the smartphone or tablet computer.

DETAILED DESCRIPTION

Generally, apps downloaded on a computing device from a digital distribution platform are not given kernel privileges, or unrestricted privileges. As an example, granting kernel privileges to an app would allow access to a secured storage location, such as a persistent memory region or secured file system of the computing device, which may introduce security issues, such as inadvertent control of the computing device by the app. Persistent memory regions generally hold unique data of computing devices, which should be secure and not accessible to any app downloaded from a digital distribution platform.

Persistent memory contains data containers called, "persistent memory regions", which contain persistent data written to the regions by programs (i.e., written by processes created by the execution of machine executable instructions). When data are allocated from a persistent memory region, persistence and reliability of such data are maintained across machine reboots and failures. Therefore, if a failure, or fault, occurs in the computing device during program execution, for example, a recovery process may be transparently initiated on restart of the computing device to maintain consistency of the data in the persistent memory regions. To the contrary, data, which are not in a persistent memory region may be considered logically transient.

Examples disclosed herein provide the ability for a non-system application downloaded on a computing device, such as an app downloaded from a digital distribution platform, to gain controlled access to secured storage locations of the computing device, such as a persistent memory region, for example, for storing keys/credentials, all without impacting device security. As a result, when an event, such as a factory reset, takes place on the computing device, persistence and reliability of any data, for example, created in the persistent memory region, is maintained. This may be particularly useful, for example, when a mobile device management (MDM) app is downloaded on the computing device, for administration of computing devices in an enterprise setting.

By being provided controlled access to a secured storage location, such as the persistent memory region, the MDM app may be able to store keys in the persistent memory region, which remains, for example, even after a factory reset. As an example, if a computing device that is being managed by the MDM app is stolen, if efforts are made to reset the computing device to factory conditions, the keys written by the MDM app in the persistent memory region remains, and the computing device may still be recoverable (i.e., anti-theft measures).

Figure 1:
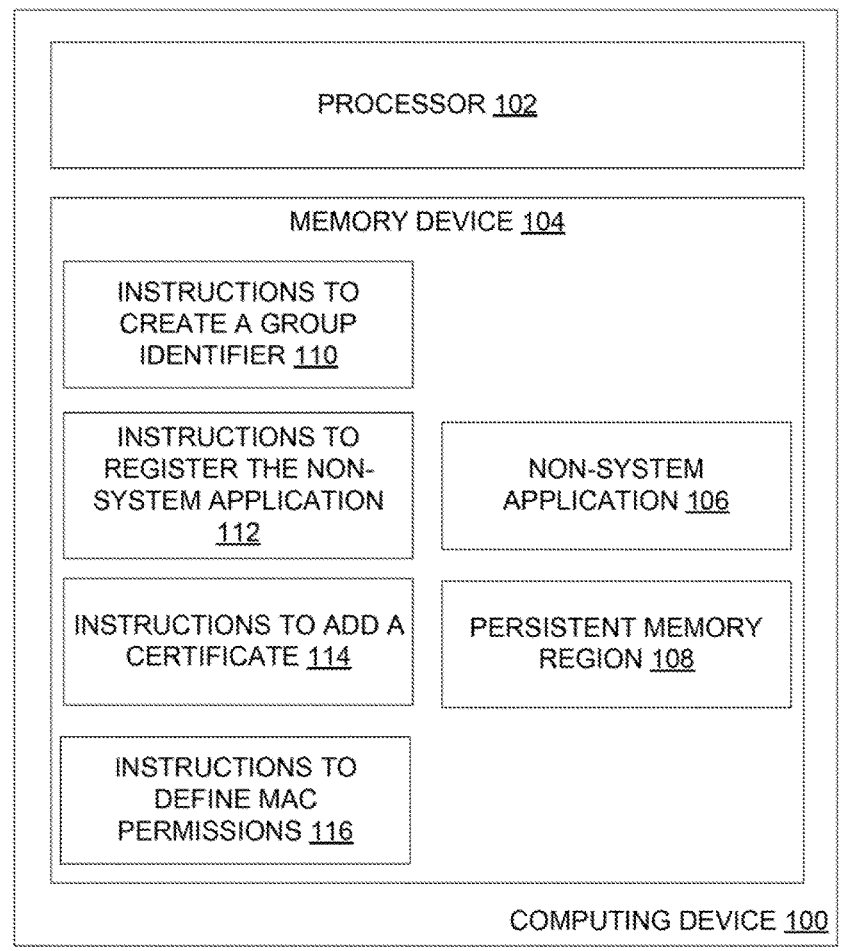
FIG. 1 illustrates a computing device that provides the ability for a non-system application to gain controlled access to secured storage locations of the computing device 100, according to an example.

With reference to the figures, FIG. 1 illustrates a computing device 100 that provides the ability for a non-system application 106 downloaded on the computing device 100, to gain controlled access to secured storage locations of the computing device 100, such as a persistent memory region 108, according to an example. As mentioned above, by providing the non-system application 106 controlled access to the persistent memory region 108, the non-system application 106 may then, as an example, be able to store keys/credentials in the persistent memory region 108, which persists even after a factory reset.

Generally, system applications of the computing device 100, such as a native web browser, native virtual private network (VPN) client, and mapping program, may already have access to the persistent memory region 108. However, such system applications, which are integrated to the platform of the computing device 100, may only be updateable by a full device upgrade of the computing device 100. This may not be desirable in situations when only a particular system application may need to be updated (e.g., mapping program). Non-system applications though, such as the MDM app described above, may be downloaded onto the computing device 100 from a digital distribution platform, and updated by itself, whenever an update is made available via the digital distribution platform. In addition, by being provided controlled access to a secured storage location of the computing device 100, such as the persistent memory region 108, non-system applications may be an ideal solution for mobility device management of the computing device 100.

The computing device 100 depicts a processor 102 and a memory device 104 and, as an example of the computing device 100 performing its operations, the memory device 106 may include instructions 110-116 that are executable by the processor 102. Thus, memory device 104 can be said to store program instructions that, when executed by processor 102, implement the components of the computing device 100. The executable program instructions stored in the memory device 104 include, as an example, instructions to create a group identifier (110), instructions to register the non-system application 106 to the group identifier (112), instructions to add a certificate associated with the non-system application 106 to a mandatory access control (MAC) list (114), and instructions to define permissions to the non-system application 106 (116).

Instructions to create a group identifier (110) represent program instructions that when executed by the processor 102 cause the computing device 100 to create a group identifier that provides permission to only a specific location under the persistent memory region 108, and not other locations of the persistent memory region 108. By creating a group identifier that provides access to only specific partitions of the persistent memory region 108, applications, such as the non-system application 106, may be given controlled system level privileges, as will be further described.

Instructions to register the non-system application 106 to the group identifier (112) represent program instructions that when executed by the processor 102 cause the computing device 100 to register a unique identifier of the non-system application 106 to the group identifier. As an example, with the non-system application 106 being downloadable from a digital distribution platform for applications for the computing device 100, as described above, a name associated with the non-system application 106 on the digital distribution platform may be used for registering the non-system application 106 to the group identifier. Generally, each application available on the digital distribution platform has a unique name, so that users can search for an application by its name.

Instructions to add a certificate associated with the non-system application 106 (114) represent program instructions that when executed by the processor 102 cause the computing device 100 to add a certificate associated with the non-system application 106 to a mandatory access control (MAC) permission list. Similar to the name of the non-system application 106, the certificate associated with the non-system application 106 is unique from certificates of other applications available on the digital distribution platform. As an example, certificates of applications available on the digital distribution platform may be unique for each application, and granted by the digital distribution platform in order to verify validity or authenticity of the application.

MAC generally refers to a type of access control by which the operating system of the computing device 100 constrain the ability of a subject or initiator to access or generally perform some sort of operation on an object or target. Upon adding the certificate associated with the non-system application 106 to the MAC permission list, the "subject" or "initiator" can refer to the non-system application 106, upon receiving access from the MAC, then having the ability to perform some sort of operation on an object or target. As will be further described, the "object" or "target" can refer to the specific location under the persistent memory region 108, identified by the group identifier.

Adding the certificate associated with the non-system application 106 to the MAC permission list may not be sufficient for giving the non-system application 106 system level privilege (e.g., ability to access the specific location under the persistent memory region 108, identified by the group identifier). Rather, instructions to define permissions to the non-system application 106 (116) represent program instructions that when executed by the processor 102 cause the computing device 100, upon adding the certificate to the MAC permission list, to define MAC permissions to the non-system application 106, with regards to accessing the specific location under the persistent memory region 108. Examples of the permissions for the non-system application 106 to access the specific location under the persistent memory region 108 include, but are not limited to, reading, writing, executing, and creating data in the specific location under the persistent memory region 108.

By registering the non-system application 106 to a group identifier that has permission or access to only a specific location under the persistent memory region 108, and then adding a certificate associated with the non-system application to a MAC permission list, the computing device 100, via MAC permissions, may provide the non-system application 106 controlled access to secured storage locations of the computing device 100, such as the specific location under the persistent memory region 108. As described above, this controlled access of a secured storage location may be used for storing keys/credentials, all without impacting device security. For example, data created by the non-system application 106 in the specific location under the persistent memory region 108 may remain, even after a factory reset of the computing device 100. As described above, the non-system application 106 may refer to an MDM app that stores keys in the specific location under the persistent memory region 108, in order to be able to recover a device, even after a factory reset has been performed.

Memory device 104 represents generally any number of memory components capable of storing instructions that can be executed by processor 102. Memory device 104 is non-transitory in the sense that it does not encompass a transitory signal but instead is made up of at least one memory component configured to store the relevant instructions. As a result, the memory device 104 may be a non-transitory computer-readable storage medium. As illustrated, the non-system application 106 may be downloaded to the memory device 104. In addition, the persistent memory region 108 may refer to a secure area of the memory device 104. However, the non-system application 106 and the persistent memory region 108 are not limited to being in the memory device 104, as illustrated, but may also be located in other storage mediums of the computing device 100. Memory device 104 may be implemented in a single device or distributed across devices. Likewise, processor 102 represents any number of processors capable of executing instructions stored by memory device 104. Processor 102 may be integrated in a single device or distributed across devices. Further, memory device 104 may be fully or partially integrated in the same device as processor 102, or it may be separate but accessible to that device and processor 102.

In one example, the program instructions 110-116 can be part of an installation package that when installed can be executed by processor 102 to implement the components of the computing device 100. In this case, memory device 104 may be a portable medium such as a CD, DVD, or flash drive or a memory maintained by a server from which the installation package can be downloaded and installed. In another example, the program instructions may be part of an application or applications already installed. Here, memory device 104 can include integrated memory such as a hard drive, solid state drive, or the like.

Figure 2:
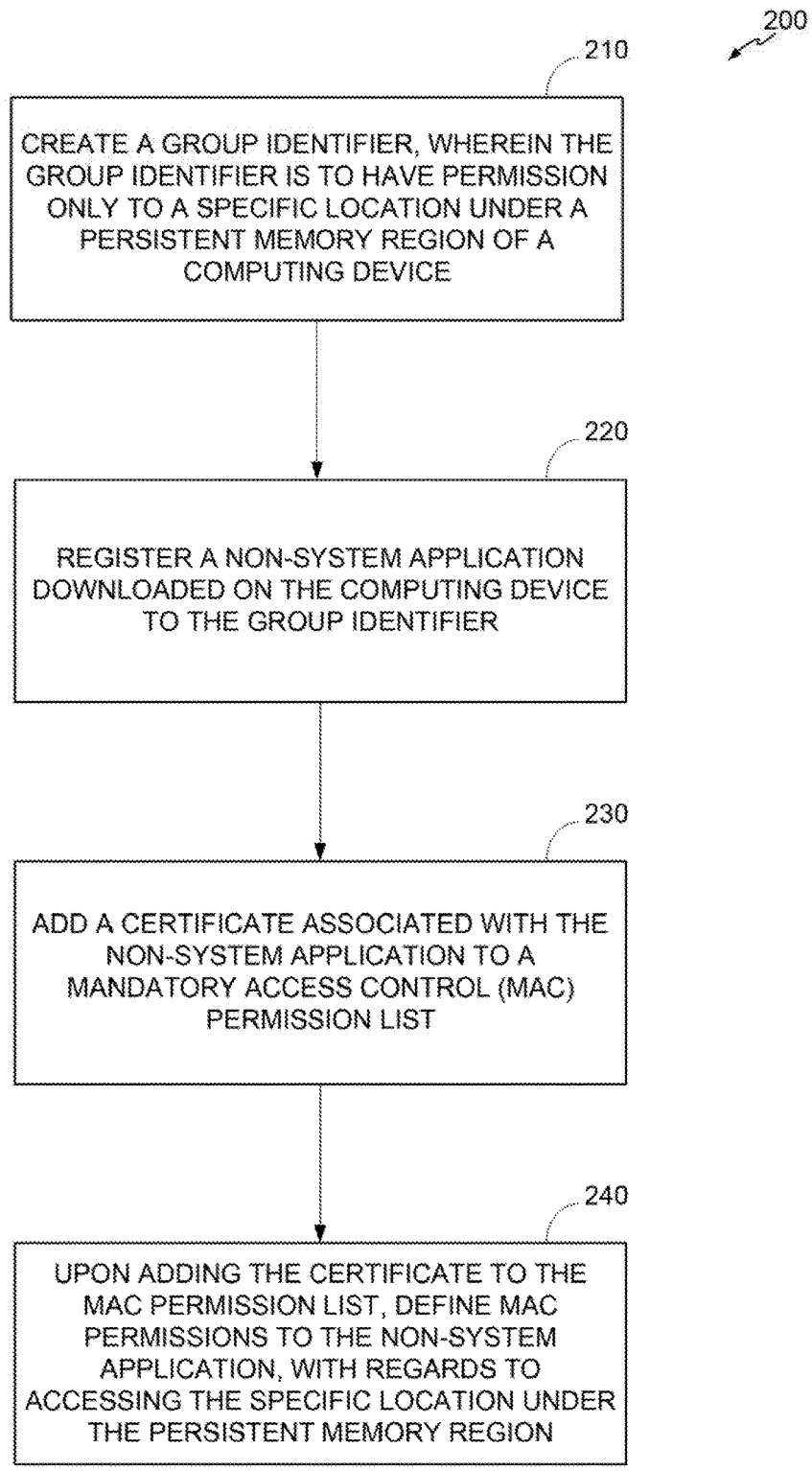
FIG. 2 is a flow diagram in accordance with an example of the present disclosure.

FIG. 2 is a flow diagram 200 of steps taken by a computing device to implement a method for a non-system application downloaded on the computing device to gain controlled access to a secured storage location of the computing device, such as a persistent memory region, according to an example. In discussing FIG. 2, reference may be made to the example computing device 100 illustrated in FIG. 1. Such reference is made to provide contextual examples and not to limit the manner in which the method depicted by FIG. 2 may be implemented.

At 210, the computing device creates a group identifier that provides permission to only a specific location under the persistent memory region, and not other locations of the persistent memory region. By creating a group identifier that provides access to only specific partitions of the persistent memory region, applications, such as the non-system application, may be given controlled system level privileges. At 220, the computing device may register the non-system application to the group identifier. As an example, with the non-system application being downloadable from a digital distribution platform for applications for the computing device, a name associated with the non-system application on the digital distribution platform may be used for registering the non-system application to the group identifier.

At 230, the computing device adds a certificate associated with the non-system application to a MAC permission list. Similar to the name of the non-system application, the certificate associated with the non-system application is unique from certificates of other applications available on the digital distribution platform. As an example, certificates of applications available on the digital distribution platform may be unique for each application, and granted by the digital distribution platform in order to verify validity or authenticity of the application.

At 240, upon adding the certificate to the MAC permission list, the computing device defines MAC permissions to the non-system application. As an example, the MAC permissions include information regarding the accessing of the specific location under the persistent memory region. Examples of the permissions for the non-system application to access the specific location under the persistent memory region include, but are not limited to, reading, writing, executing, and creating data in the specific location under the persistent memory region. As described above, data created by the non-system application in the specific location under the persistent memory region may remain, even after a factory reset of the computing device.

Although the flow diagram of FIG. 2 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

As an example, rather than providing secure access for the non-system application 106 to privileged memory regions, as described above with respect to the specific locations under the persistent memory region 108, a security level of a memory region of the computing device 100 may be elevated or enhanced according to different levels, in order to make access to the memory region of the computing device 100 more or less restrictive. By controlling how restrictive it can be for a client, such as the non-system application 106, to access a particular memory region of the computing device 100, additional permissions or elevated privileges may be required for the client to access the memory region of the computing device 100.

As an example, a first level of elevating the security of a particular memory region of the computing device 100 may include creating a group identifier, and allowing members/clients registered to the group identifier to have access permission to the memory region of the computing device 100. As described above, registering a client, such as the non-system application 106, to the group identifier may include registering a unique identifier of the client to the group identifier (e.g., a name associated with the non-system application 106 on the digital distribution platform). As a result, any members/clients registered to the group identifier may only have access to the particular memory region of the computing device 100.

As an example, a second level of elevating the security of a particular memory region of the computing device 100 may include, in addition to creating the group identifier described above, defining MAC permissions for members/clients registered to the group identifier. As an example, not all members/clients registered to the group identifier receive the same privilege to access a memory region of the computing device 100. Rather, only those members/clients with particular MAC permissions may be able to access the memory region of the computing device 100.

Figure 3:
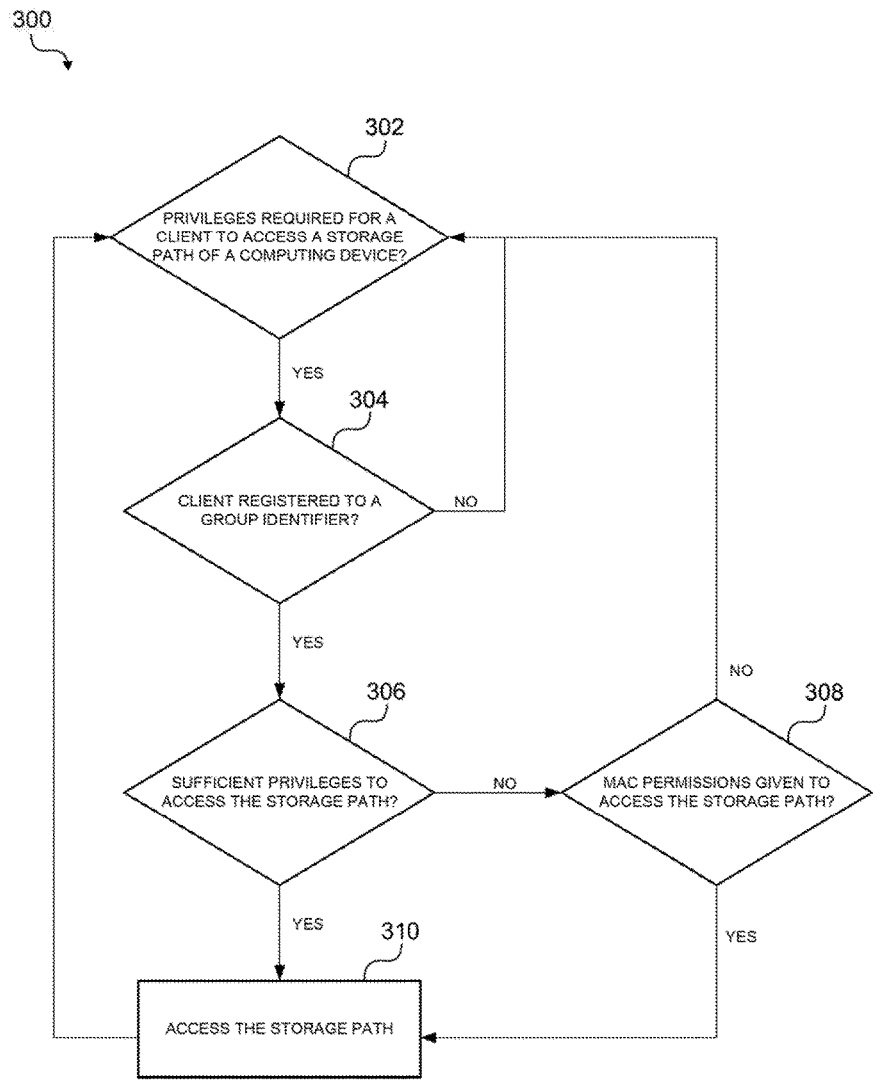
FIG. 3 illustrates a method of operation at the computing device for determining whether a client of the computing device has the privileges required for accessing a storage path of the computing device, according to an example.

FIG. 3 illustrates a method 300 of operation at a computing device for determining whether a client of the computing device has the privileges required for accessing a storage path of the computing device, according to an example. As an example, the method 300 is described with reference to computing device 100. At 302, it is determined whether privileges are required for a client, such as the non-system application 106, to access a storage path of the computing device, such as the persistent memory region 108. As described above, persistent memory regions generally hold unique data of computing devices, which should be secure and not accessible to a client unless granted privileges for access.

If privileges are required for the client to access the storage path of the computing device, at 304, it is determined whether the client is registered to a group identifier that provides permissions or privileges to access the storage path of the computing device. If so, at 306, it is determined whether being registered to the group identifier is sufficient for accessing the storage path. As described above, a client may have different levels of privileges before having access to the storage path of the computing device. If being registered to the group identifier is sufficient for gaining access to the storage path, then at 310, the client may be granted access to the storage path. However, if being registered to the group identifier is not sufficient, then at 308 it is determined whether the client has been granted MAC permissions to access the storage path. As described above, not all clients registered to the group identifier receive the same privilege to access the storage path of the computing device 100. Rather, only those clients with particular MAC permissions may be able to access the storage path of the computing device 100. If the client has the correct MAC permissions, then at 310, the client may be granted access to the storage path.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method for a non-system application downloaded onto a computing device to have access to a persistent memory region within the computing device, the method comprising:
   creating, by a processor of the computing device, a group identifier for the non-system application downloaded onto the computing device to register and have permission to access only to a specific location of the persistent memory region within the computing device, wherein the persistent memory region of the computing device is a memory region where data stored therein remains unchanged after a reboot, reset, or failure of the computing device;
   registering, by the processor, a unique identifier of the non-system application to the group identifier to provide the non-system application the permission to access the specific location of the persistent memory region of the computing device;
   in addition to registering the unique identifier of the non-system application to the group identifier, adding, by the processor, a certificate associated with the non-system application to a mandatory access control (MAC) permission list; and
   upon adding the certificate associated with the non-system application to the MAC permission list, defining specific functions in a MAC permission for the non-system application, wherein the specific functions in the MAC permission are functions, including writing and creating data, that the non-system application is permitted to perform in the specific location of the persistent memory region of the computing device,
   wherein both the unique identifier of the non-system application and the certificate associated with the non-system application in the MAC permission list are required for the non-system application to be permitted to perform the specific functions, as defined in the MAC permission, in the specific location of the persistent memory region.

2. The method of claim 1, wherein the non-system application is downloadable from a digital distribution platform for applications for the computing device.

3. The method of claim 2, wherein the non-system application is updateable via the digital distribution platform, and without a full system update for the computing device.

4. The method of claim 2, wherein the certificate associated with the non-system application is unique from certificates of other applications available on the digital distribution platform.

5. The method of claim 2, wherein registering the non-system application to the group identifier comprises registering a name associated with the non-system application on the digital distribution platform to the group identifier.

6. The method of claim 1, wherein the specific functions identified in the MAC permission further include executing data in the specific location of the persistent memory region.

7. The method of claim 1, wherein the data created in the specific location of the persistent memory region remains in the specific location of the persistent memory region after a factory reset of the computing device.

8. A non-transitory computer-readable storage medium of a computing device comprising instructions for a non-system application downloaded onto the computing device to have access to a persistent memory region within the computing device, the instructions, when executed by a processor of the computing device, to cause the processor to:
   create a group identifier for the non-system application downloaded onto the computing device to register and have permission to access only to a specific location in the persistent memory region within the computing device, wherein the persistent memory region of the computing device is a memory region where data stored therein remains unchanged after a reboot, reset, or failure of the computing device;
   register a unique identifier of the non-system application to the group identifier to provide the non-system application the permission to access to the specific location in the persistent memory region;
   in addition to registering the unique identifier of the non-system application to the group identifier, add a certificate associated with the non-system application to a mandatory access control (MAC) permission list, wherein the certificate for the non-system application is unique from certificates of other applications downloaded on the computing device; and
   upon adding the certificate associated with the non-system application to the MAC permission list, define specific functions in a MAC permission for the non-system application, wherein the specific functions in the MAC permission are functions, including writing and creating data, that the non-system application is permitted to perform in the specific location of the persistent memory region of the computing device,
   wherein both the unique identifier of the non-system application and the certificate associated with the non-system application in the MAC permission list are required for the non-system application to be permitted to perform the specific functions as defined in the MAC permission in the specific location of the persistent memory region.

9. The non-transitory computer-readable storage medium of claim 8, wherein the non-system application is downloadable from a digital distribution platform for applications for the computing device.

10. The non-transitory computer-readable storage medium of claim 9, wherein the instructions to cause the processor to register the non-system application to the group identifier comprises instructions to cause the processor to register a name associated with the non-system application on the digital distribution platform to the group identifier.

11. The non-transitory computer-readable storage medium of claim 8, wherein the specific functions identified in the MAC permission further include executing data in the specific location of the persistent memory region.

12. The non-transitory computer-readable storage medium of claim 8, wherein the data created in the specific location of the persistent memory region remains in the specific location of the persistent memory region after a factory reset of the computing device.

13. A method for a non-system application downloaded onto a computing device to have access to a specific storage location of a persistent memory region in the computing device, the method comprising:
   determining whether the non-system application downloaded onto the computing device is registered to a group identifier, wherein being registered to the group identifier provides the non-system application permission to have access to the specific storage location of the persistent memory region in the computing device, wherein the persistent memory region in the computing device is a memory region where data stored therein remains unchanged after a reboot, reset, or failure of the computing device;

in response to a determination that the non-system application is registered to the group identifier, determining, by the processor, whether a mandatory access control (MAC) permission list stored in the computing device contains a certificate and a MAC permission for the non-system application, wherein the MAC permission for the non-system application indicates specific functions, including writing and creating data, that the client non-system application is permitted to perform in the specific storage location of the persistent memory region in the computing device; and in response to a determination that the MAC permission list contains the certificate and the MAC permission for the non-system application, granting the non-system application to perform the specific functions, as indicated in the MAC permission of the non-system application, in the specific storage location of the persistent memory region in the computing device.

14. The method of claim 13, wherein the specific functions indicated in the MAC permission include storing keys or credentials data in the specific storage location of the persistent memory region.

15. The method of claim 13, comprising:

denying the non-system application access to the specific storage location of the persistent memory region in response to a determination that the non-system application was not granted a MAC permission.

* * * * *

UNITED STATES PATENT AND TRADEMARK OFFICE
CERTIFICATE OF CORRECTION

Page 1 of 1

PATENT NO. : 10,366,016 B2
APPLICATION NO. : 15/223185
DATED : July 30, 2019
INVENTOR(S) : Sudish Mukundan It is certified that error appears in the above-identified patent and that said Letters Patent is hereby corrected as shown below:

On the Title Page

In Column 1, item (12), Line 2, delete "Mukunan" and insert -- Mukundan --, therefor.

In Column 1, item (72), Inventor, Line 1, delete "Sudish Mukunan," and insert -- Sudish Mukundan, --, therefor.

In the Claims

In Column 9, Line 8, Claim 13, after "the" delete "client".

Signed and Sealed this
Nineteenth Day of November, 2019

Andrei Iancu
*Director of the United States Patent and Trademark Office*